(12) United States Patent
Hopeman et al.

(10) Patent No.: US 6,606,621 B2
(45) Date of Patent: Aug. 12, 2003

(54) METHODS AND APPARATUS FOR AGGREGATING SPARSE DATA

(75) Inventors: Albert A. Hopeman, Arlington, MA (US); Caleb E. Welton, Malden, MA (US); Grant E. Hicks, Acton, MA (US)

(73) Assignee: Oracle International Corp., Redwood Shores, CA (US)

( * ) Notice: Subject to any disclaimer, the term of this patent is extended or adjusted under 35 U.S.C. 154(b) by 124 days.

(21) Appl. No.: 09/870,271

(22) Filed: May 30, 2001

(65) Prior Publication Data

US 2002/0194163 A1 Dec. 19, 2002

(51) Int. Cl.[7] .............................................. G06F 17/30
(52) U.S. Cl. .................................................. 707/3; 707/4
(58) Field of Search ............................... 707/1, 2, 3, 4, 707/100, 102, 103 R

(56) References Cited

U.S. PATENT DOCUMENTS

| | | | | |
|---|---|---|---|---|
| 5,822,751 A | * | 10/1998 | Gray et al. | 707/3 |
| 5,978,796 A | * | 11/1999 | Malloy et al. | 707/3 |
| 5,987,467 A | * | 11/1999 | Ross et al. | 707/100 |
| 6,003,036 A | * | 12/1999 | Martin | 707/102 |
| 6,163,774 A | * | 12/2000 | Lore et al. | 707/2 |
| 6,216,125 B1 | * | 4/2001 | Johnson | 707/4 |
| 6,424,967 B1 | * | 7/2002 | Johnson et al. | 707/3 |

* cited by examiner

*Primary Examiner*—Diane D. Mizrahi
(74) *Attorney, Agent, or Firm*—Sanjay Prasad

(57) ABSTRACT

A method for aggregating sparse data in a multidimensional array by using a composite join hierarchy created by segmenting the data so that each segment of the hierarchy processed is smaller and more likely to fit in memory. The method employs a recursive sub-cubing mechanism wherein an n-dimensional cube is broken into a number of (n–1)-dimensional cubes and each of those cubes are solved as (n–2)-dimensional cubes etc. Within each division, the processing is segmented by hierarchy level so a dimension with three hierarchy levels (for example, month-quarter-year) would form three separate subcubes with one less dimension. This algorithm produces one 'worklist' for every combination of hierarchy levels in the cube. Each of these worklists is represented as a bitmap of the cells contained within it and may be used as a basis of generating more aggregate worklists. To minimize the need for input-output data transfers, all the derived worklists of a single worklist are generated at the same time. This is accomplished without keeping more than n-worklists active at any given time to reduce the number of input-output data transfers needed without requiring substantially larger memory space.

12 Claims, 10 Drawing Sheets

METHODS AND APPARATUS FOR AGGREGATING SPARSE DATA

FIELD OF THE INVENTION

This invention relates to data storage and retrieval systems and more particular to multidimensional databases implemented by relational database management systems.

BACKGROUND OF THE INVENTION

A multi-dimensional database comprises a group of data cells arranged by the dimensions of the data. For example, a spreadsheet exemplifies a two-dimensional array with the data cells arranged in rows and columns, each being a dimension. A three-dimensional array can be visualized as a cube with each dimension forming a side of the cube, including any slice parallel with that side. Higher dimensional arrays have no physical metaphor, but typically organize the data in the way users think of their enterprise. Typical enterprise dimensions are time, measures, products, geographical regions, sales channels, etc . . .

In a multi-dimensional database there is a need to be able to aggregate a large amount of data quickly and efficiently. Multi-dimensional databases generally have hierarchies or formula-based relationships of data within each dimension. Aggregation (also called "consolidation" and "roll up") involves computing all of these data relationships for one or more dimensions, for example, adding up all Departments to get Total Division data. While such relationships are normally summations, any type of computational relationship or formula might be defined. Typically, database users have a given time window that they need to be able to fit the aggregation process into and the speed of the database determines the amount of data that they can process in that time. The performance of this one operation therefore has a large impact on the usefulness of the database. Improving the aggregation speed not only assists current users in handling more data faster, but can also makes the database attractive to new users when its capabilities improve enough to fit their requirements.

In typical cases a large portion of the data in a multidimensional database is extremely sparse; that is, a high percentage of the possible combinations (intersections) of the members from the data set's dimensions contain missing data. The total possible number of intersections can be computed by multiplying together the number of members in each dimension. Data sets containing one percent, 0.01 percent or even smaller percentages of the possible data are quite common. Sparse data may be modeled in one of two kinds of structures: composite and conjoint dimensions. Each of these creates a mapping from a sparse multi-dimensional framework onto a single dense dimension, such that each instantiated multi-dimensional tuple corresponds to exactly one dimension value of the conjoint or composite. The difference between the two types is that the composite handles most of the complexity transparently while the conjoint makes it explicit. The transparent nature of composites leads to decreased complexity and easier administration as well as the potential to optimize parts of its layout and construction internally.

Traditionally the process for aggregating sparse data is done in one of two ways differentiated by whether the aggregation is occurring over a conjoint or a composite dimension.

Aggregation over a composite dimension occurs as several aggregations, one for each base dimension of the composite. Each base is aggregated as if it was a dense dimension and a temporary new composite of the remaining dimensions is used for looping. Further if any base dimensions have multiple hierarchies over them, this aggregation over the base will occur once for each such hierarchy.

Aggregation over a conjoint dimension occurs by first transforming each base dimension hierarchy into a hierarchy on the conjoint dimension. Once these hierarchies are created the conjoint is aggregated on each of these hierarchies resulting in the same number of aggregation passes as the composite solution. This method takes more administrative setup than the composite solution, but does not require creating the temporary new composite of the remaining base dimensions.

In a preferred method employed in the Oracle Express Server available from Oracle Corporation of Redwood Shores, Calif., a "composite join hierarchy" is derived from all of the base hierarchies of the composite. This join hierarchy encapsulates all the information of all base hierarchies into a single hierarchy over the composite itself. Once this hierarchy is created the composite can be treated just like a large base dimension with a single hierarchy, allowing it to be aggregated in a single pass. This composite join hierarchy is transparently created, has the ease of administration of the composite solution, and outperforms aggregation over a conjoint dimension or over a composite dimension in nearly all cases.

BRIEF SUMMARY OF THE INVENTION

The present invention takes the form of a method for aggregating sparse data in a multidimensional array using a composite-join hierarchy in a way that segments the data so that any piece of the hierarchy is smaller and more likely to fit in memory.

The algorithm can be thought of as a recursive sub-cubing, wherein an n-dimensional cube is broken into a number of (n−1)-dimensional cubes and each of those cubes are solved as (n−2)-dimensional cubes etc. Within each division, the processing is segmented by hierarchy level so a dimension with three hierarchy levels (for example, month-quarter-year) would form three separate subcubes with one less dimension. This algorithm produces one 'worklist' for every combination of hierarchy levels in the cube.

Each of these worklists may be represented as a bitmap of the cells contained within it and may be used as a basis of generating more aggregate worklists. To minimize the need for input-output data transfers, all the derived worklists of a single worklist are generated at the same time. This is accomplished without keeping more than n-worklists active at any given time with the result that a reduction in input-output data transfers is achieved with out requiring substantially larger memory space.

These and other features and advantages of the invention may be better understood by considering the detailed description that follows. In the course of this description, frequent reference will be made to the attached drawings.

DETAILED DESCRIPTION

An Illustrative Multi-Dimensional Database with Multiple Hierarchies

Within a simple base dimension in a relational database there may be logical relations between cells of the dimension that establish a hierarchy of logical levels in the dimension. For instance a time dimension may contain months, quarters, and years that are all logically connected within a defined hierarchy.

Figure 1:
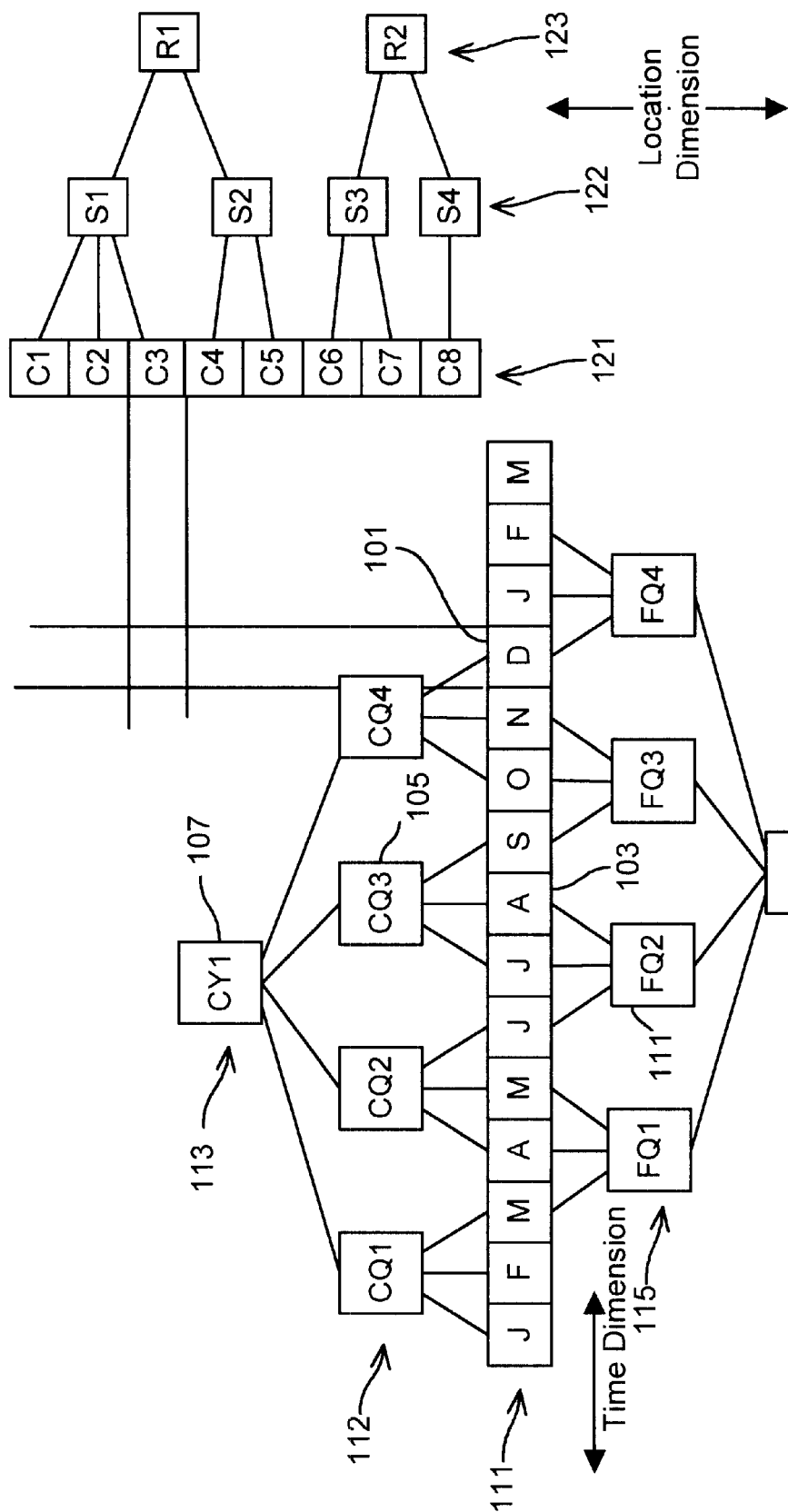
FIG. 1 is a diagram depicting an illustrative multidimensional database with two hierarchies in its time dimension and one hierarchy in its location dimension.

It is also possible to have multiple hierarchies on each base dimension. For example, the time dimension might have both calendar and fiscal year hierarchies as illustrated in FIG. 1. At the lowest detail level seen at 111, the time dimension is divided into months. However, any given month belongs to two different hierarchies. The upper hierarchy seen in FIG. 1 subdivides the time dimension at the "month" level 111 into "calendar quarters" at the parent level 112 and "calendar years" at the grandparent level 113. A second fiscal year hierarchy divides the month level 111 at parent level 115 into "fiscal quarters" and at grandparent level 116 into "fiscal years."

The illustrative multidimensional database shown in FIG. 1 also includes the location dimension seen at the right that subdivided by "city" at the most detailed level 121. The location dimension is then organized in a single state and region hierarchy consisting of the parent "state" level 122 and the grandparent "region" level seen at 123 in FIG. 1.

Thus, the individual cell seen at 101 is positioned at the intersection C3-Dec01. In the state/region hierarchy in the location dimension, the cell 101 is located within state S1 and region R1. In the calendar year hierarchy, the cell 101 is within calendar quarter CQ4 and calendar year CY1. In the fiscal year hierarchy, the cell 101 is within the fiscal quarter FQ4 of fiscal year FY1

Forming a Composite Join Hierarchy

Figure 2:
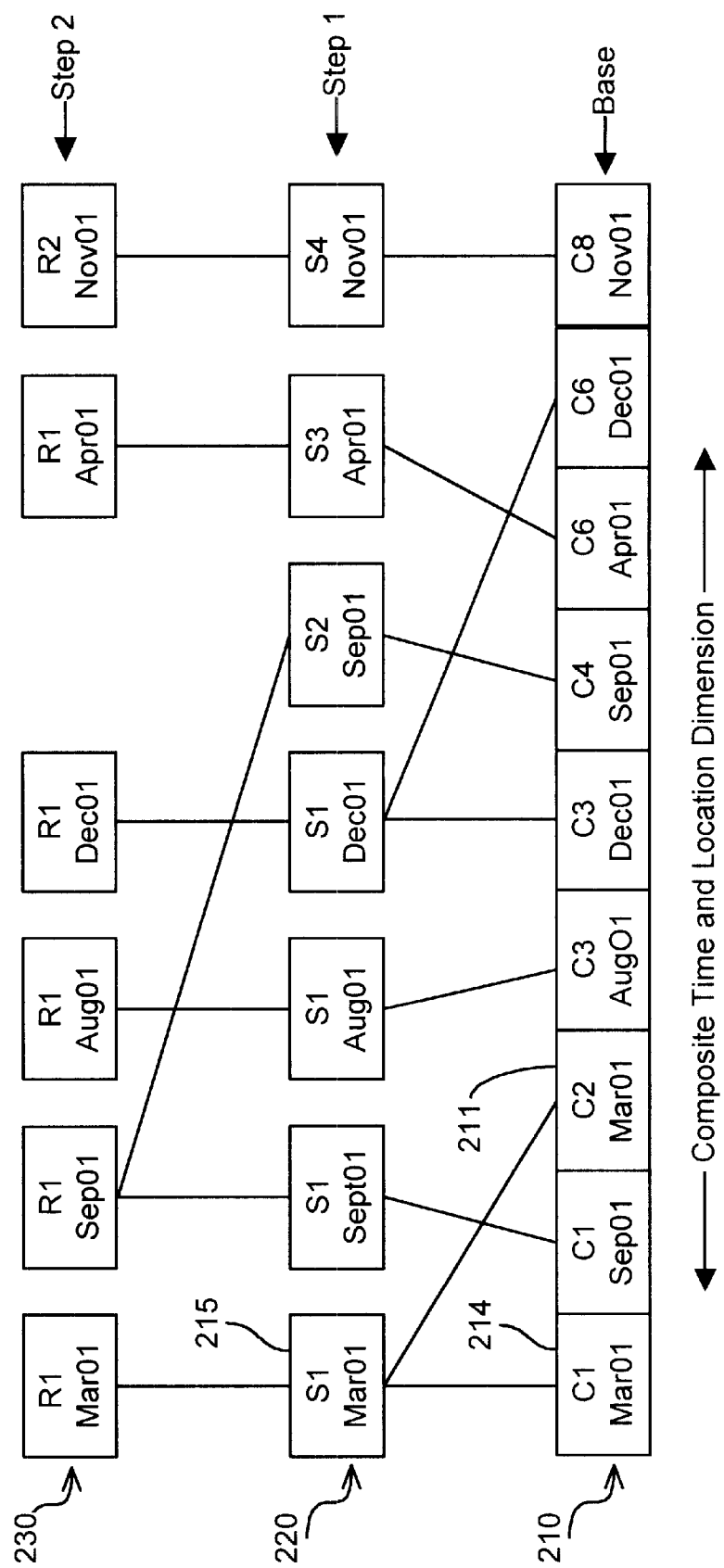
FIGS. 2 and 3 are diagrams illustrating the sequence of steps employed to create a single, multi-parent join hierarchy for the multi-dimensional database depicted in FIG. 1.

When the data is sparse, the base dimensions may be advantageously combined into a composite dimension. As indicated in FIG. 2 at 210, using the database illustrated in FIG. 1 as an example, a new composite dimension 210 may be formed from the combination of the location and time dimensions at the most detailed month and city levels. Thus, when data exists in the source database at the month/city cell location C2-Mar01, that cell is included in the composite dimension as indicated at 211.

To speed the aggregation process, a composite join hierarchy may be derived from the base hierarchies of the composite. This join hierarchy encapsulates all the information of all base hierarchies into a single hierarchy over the composite itself. Once this hierarchy is created, the composite can be treated just like a large base dimension with a single hierarchy, allowing it to be aggregated in a single pass.

The first step in creating a composite join hierarchy is to compress the multiple hierarchies into a single multi-parent hierarchy. This is accomplished by transforming these hierarchies from hierarchies over the bases to hierarchies over the new composite dimension and then merging them together into a single join hierarchy.

Figure 20:
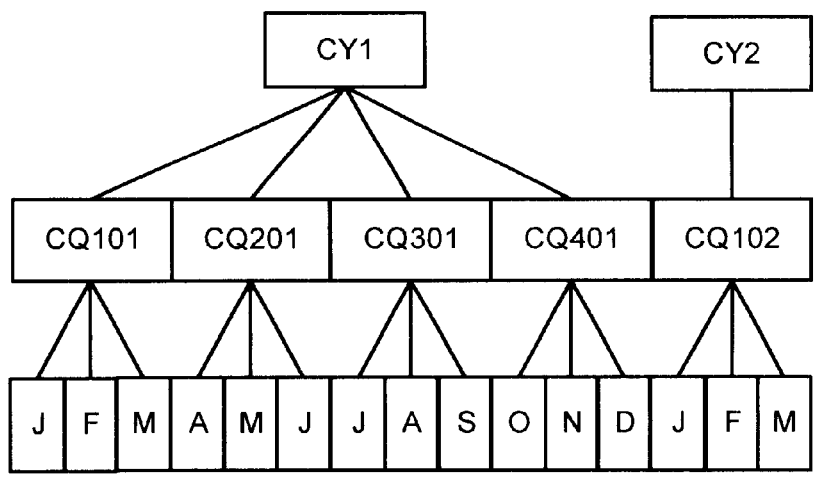
FIGS. 20–22 illustrate the manner in which plural hierarchies on the same dimension are merged to form a single multi-parent hierarchy.
Figure 21:
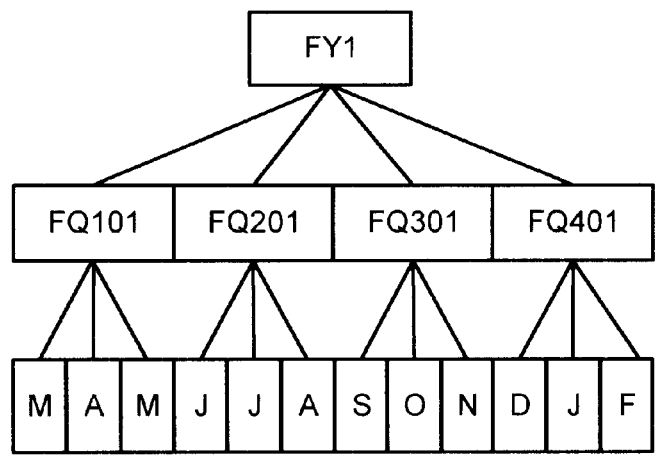
Figure 22:
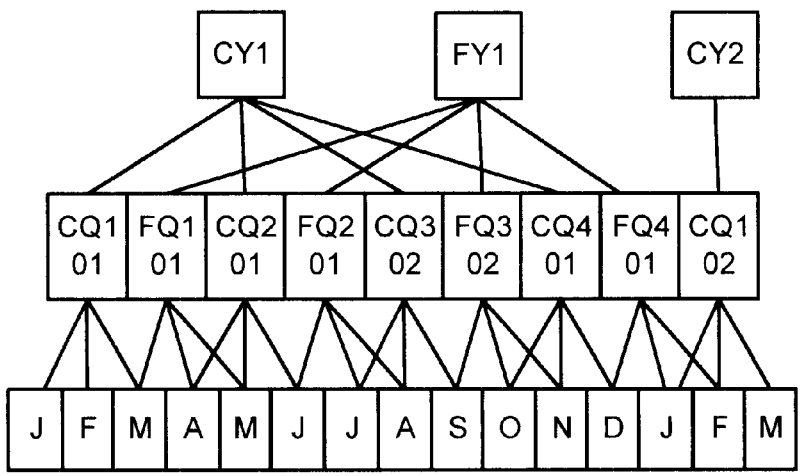

The merging of multiple hierarchies on a single dimension is illustrated in FIGS. 20–21 of the drawings. In the example shown in FIG. 20, the time dimension at the month level is organized into calendar quarters and calendar years. These months are also organized into fiscal quarters and fiscal years in a second hierarchy shown in FIG. 21. As seen in FIG. 22, these two hierarchies may be merged to form a single, multi-parent hierarchy. The step of merging the hierarchies over each base dimension is performed as a first pass through each base dimension, constructing a single merged multiparent hierarchy based on any multiple hierarchies over that dimension.

Figure 23:
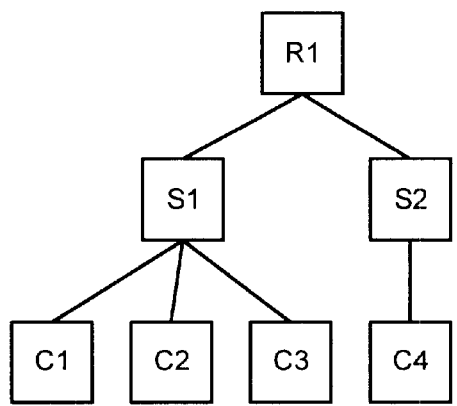
FIGS. 23–27 illustrate the manner in which inconsistent hierarchies on the same dimension are merged.
Figure 24:
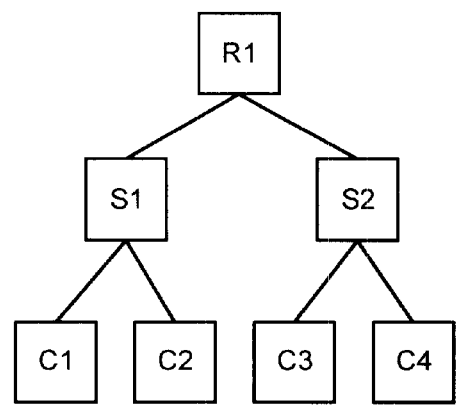
Figure 25:
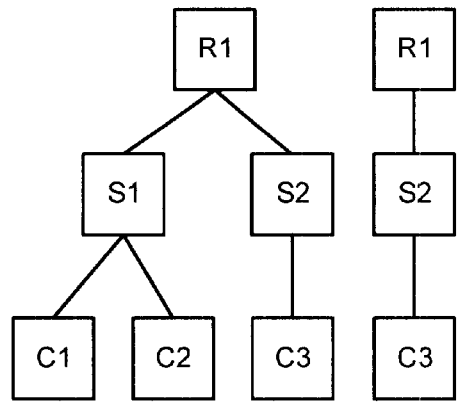
Figure 26:
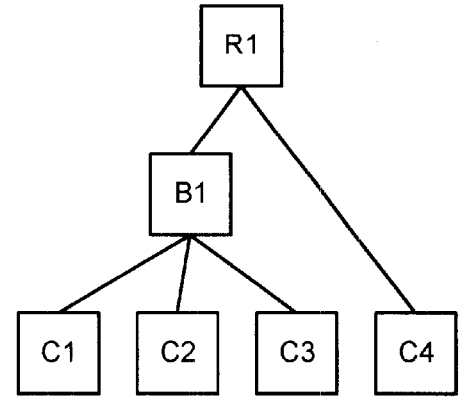
Figure 27:
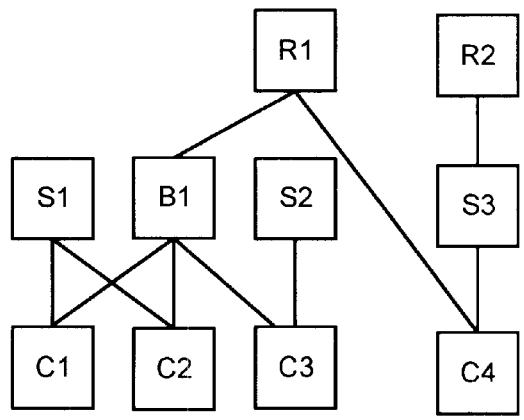

It is possible, however, for different hierarchies on the same dimension to have inconsistent structures. As a first example, compare the hierarchy shown in FIG. 23 with the hierarchy shown in FIG. 24. These hierarchies are "inconsistent" because the give different definitions for the children of the parents S1 and S2. When inconsistencies of this kind occur, the last hierarchy is used and the first is ignored. A second example of inconsistent hierarchies is shown in FIGS. 25 and 26, in which the grandparent R1 is inconsistently defined. Again, as seen in the resulting single hierarchy shown in FIG. 27, the last hierarchy encountered is used for the definition of R1, and to that extent the first hierarchy is ignored.

After the merging process is completed, the resulting single merged hierarchies are then processed as follows:

Step 1. For each detail cell in the composite dimension, add relations to the parent composite cell based on the current merged hierarchy, keeping track of all the parent cells that are referenced. Thus, in the simplified example seen in FIG. 2, if the state and region hierarchy in the location dimension is chosen as the first hierarchy to be processed, new relations are added to each used parent cell at the state level 220 as represented by the lines joining the composite dimension cells at the detail level 210 and the cells at the state-month level 220. Thus, detail cells C1-Mar01 at 214 and C2-March01 at 211 have the same state/month parent cell S1-Mar01 seen as 215 (since C1 and C2 are in the same state S1). This first step thus forms a list of state/month parent cells that is then processed in the second step described next.

Step 2. The parent cells at the state-month level 220 are then processed, adding the relations to the occupied grandparent cells seen at level 230 in a similar manner. Each created list of cells is then processed in the same way until the top of the hierarchy is reached. Thus, in the example of FIG. 2, after all of the parents at the state/month level 220 are added, these new cells at 220 are processed to add the relations to the grandparent cells at the region/month level indicated at 230, which is the top of the location hierarchy. This completes the processing of the location hierarchy, and attention may next be turned to the merged hierarchies in the time dimension as discussed next.

Figure 3:
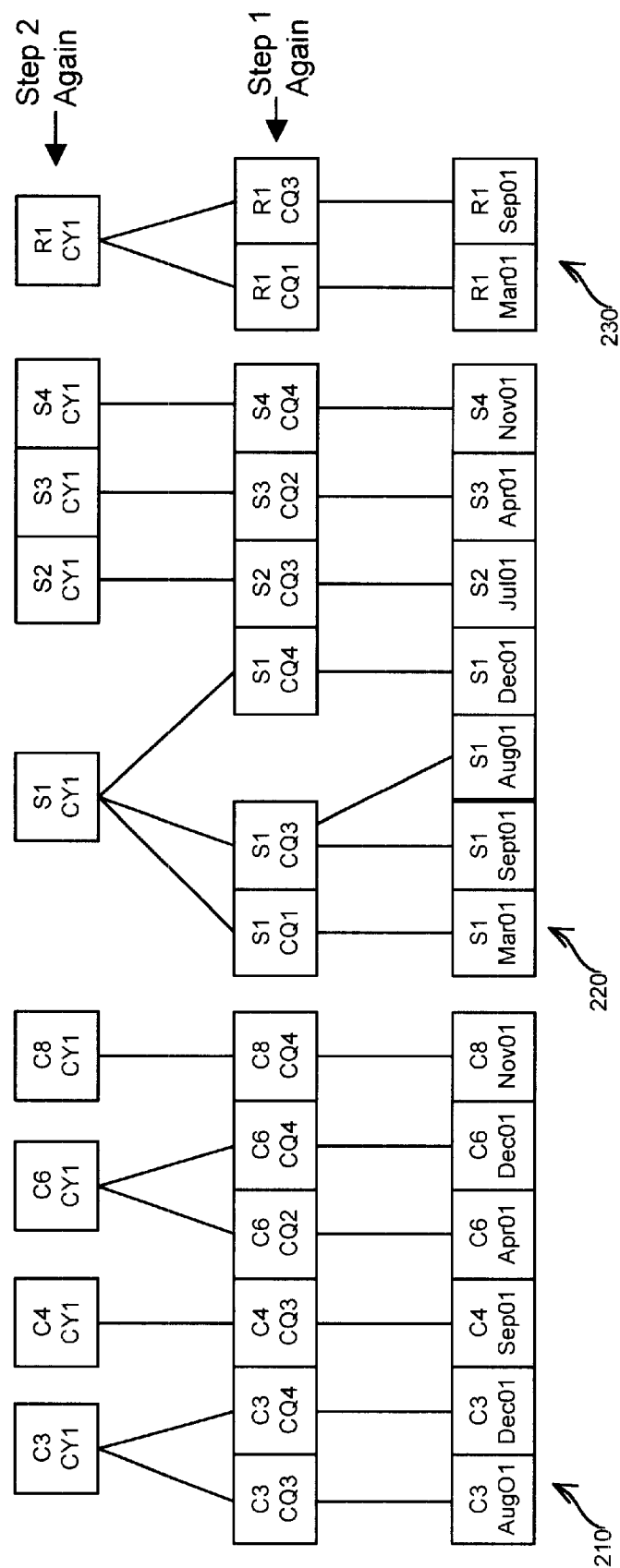

Step 3. The original detail cells and all the parent cells that added during the processing of the first hierarchy may then be combined, and steps 1 and 2 repeated using the new combined list of cells a the new base thus form a new combined cell listing, and repeating again until all hierarchies are processed. Thus, in the example, after the location hierarchy is processed as illustrated in FIG. 2, the combined list of cells at the beginning of Step 3 consists of the original city/month cells 210, the state/month cells 220 created by Step 1 seen in FIG. 2, and the region/month cells 230 created by Step 2 seen in FIG. 2. To simplify the drawing, the fiscal year hierarchy has been eliminated from the example of FIG. 2, and only a portion of the combined list of cells from FIG. 2 are shown at the bottom level in FIG. 3. The combined list created during processing of the location hierarchy is used as the base for processing the calendar year hierarchy, adding the list of city/calendar-quarter cells at level 320, which is in turn processed to add the list of city/calendar-year cells seen at 330. Note that any other hierarchies over the time dimension (not shown in drawings) will be processed simultaneously with the calendar hierarchy). This is handled by merging all multiple hierarchies on each base dimension into a single merged hierarchy used during processing as noted above.

Figures 4, 5, 6:
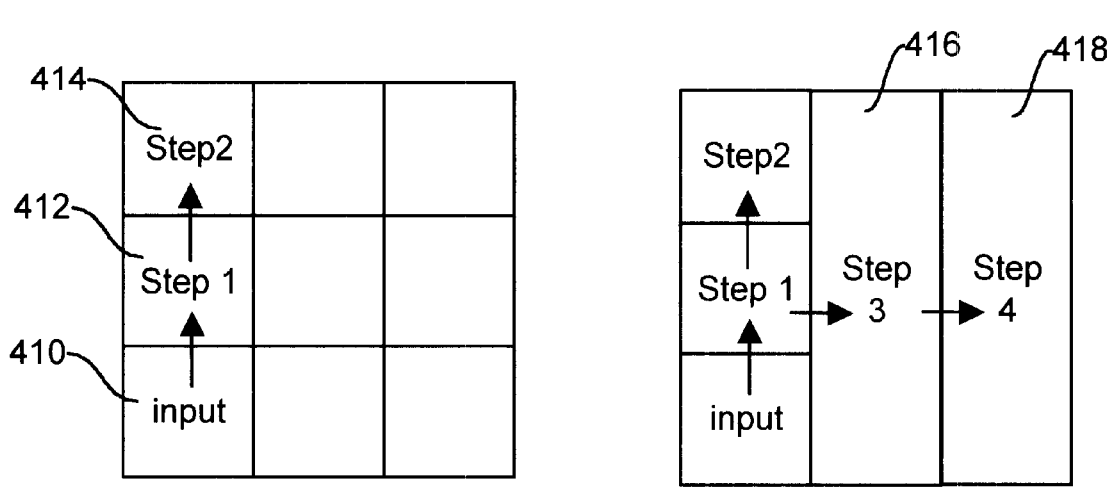
FIG. 4 is a layout diagram illustrating the relationship between the hierarchies processed in the illustrative example processes depicted in FIGS. 5–6 and FIGS. 7–10.
FIGS. 5 and 6 provide an overview illustration of the order in which hierarchical levels are processed by the first method described in connection with FIGS. 1–3.

The general approach described above is depicted in a simplified example process shown in FIGS. 4–6 in which a two-dimensional database having a hierarchy on both the time and location dimensions is processed to create a join hierarchy. As seen in the hierarchy relation diagram of FIG. 4, a first three-level (month-quarter-year) hierarchy is defined over the time dimension, and a second three-level (city-state-region) hierarchy is defined over the location dimension. The relationship between these two hierarchies is mapped into the 3×3 matrix seen in FIG. 4. The input data used as the base data for creating the join hierarchy is the composite city-month detail data (e.g. <C3-Aug01>) that seen at 410 in the lower left corner of the matrix in FIG. 4. A first method creating a join hierarchy for this data will be described first using FIGS. 5 and 6, and later the second, preferred method using recursive sub-cubing will be described using FIGS. 7–10.

As shown in FIG. 5, as the first step of the first method, the input composite data at 410 is first processed with respect to the "quarter" level of the time dimension, building a list of relations between the occupied cells in the composite dimension (the city-month zone 410; e.g. <C3-Aug01>) and their parent cells in the city-quarter zone at 412 (e.g. <C3-CQ3>). Thereafter, in the second step, the identified cells in the city-quarter zone 412 are processed to build the list of relations to the grandparent cells in the city-year zone 414 (e.g. <C3-CY1).

After the quarter and year levels have been processed to complete the hierarchy over the time dimension, the resulting combined cell list is then processed with respect to the state level of the location hierarchy in the third step shown in FIG. 5, creating the list of parent cells at the state level in the location dimension depicted by the zone 416. Finally, in the fourth step, the parent cells in the state level cells zone 416 are processed to list the grandparent cells at the region level in zone 418, completing the composite join hierarchy.

The method described above operates by processing the composite detail cells in the time dimension first. Alternatively, the input data could be processed in the location dimension first. Processing the hierarchies in different orders will yield different join hierarchies, reflecting the fact that it is possible to derive the aggregate cells in different ways. The important property that they all share is that each child will aggregate into its ancestors exactly once. Once the join hierarchy is formed the entire composite can be treated exactly the same as any dense dimension during the aggregation.

The main disadvantage in employing the composite-join hierarchy method described above is the overhead attributable to the processing needed to create the join-hierarchy. In some cases it may take longer to create the join hierarchy than the time saved in the aggregation. However the actual aggregation should always proceed faster since it is making a single aggregation pass over the composite, rather than one for every hierarchy on every base dimension. During this single pass, the composite is treated as a dense dimension rather than a sparse one, making it unnecessary to resynchronize the composite and base dimension values, thus reducing the cost of aggregating the dimension. Unlike the composite rollup, the processing time is only dependent on the number of values aggregated rather than on the sparsity of the data, yielding further improvement in performance for extremely sparse data.

The Preferred Recursive Sub-Cubing Method

FIGS. 7–10 of the drawings illustrate an improved method for aggregating sparse data in a multidimensional array using a composite-join hierarchy. This improved method segments the data such that the portion of the hierarchy that is being processed at any given time is smaller and more likely to fit in memory.

This second method can be thought of as a recursive sub-cubing, wherein an n-dimensional cube is broken into a number of (n−1)-dimensional cubes and each of those cubes are processed as (n−2)-dimensional cubes etc. Within each division, the processing is segmented by hierarchy level so a dimension with three hierarchy levels (for example, month-quarter-year) would form three separate sub-cubes with one less dimension. This method produces one 'worklist' for every combination of hierarchy levels in the cube.

Figure 8:
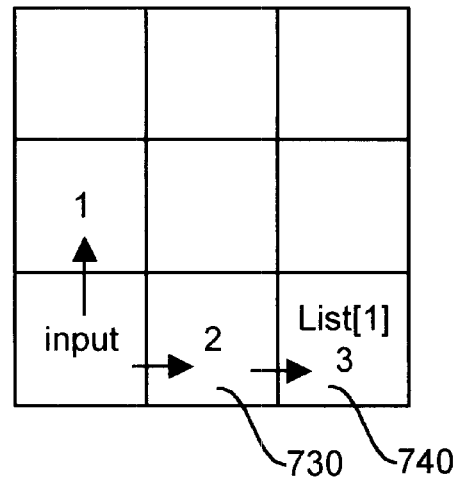
Figure 9:
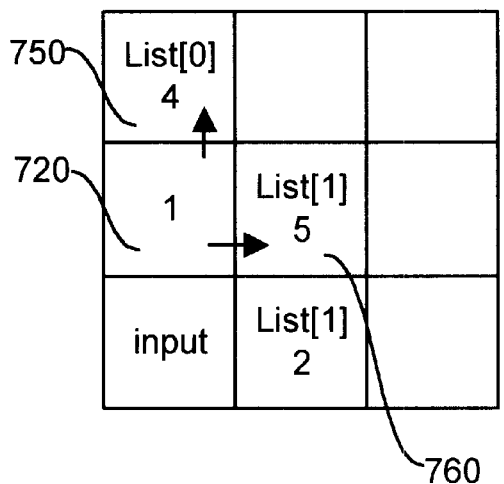
Figure 10:
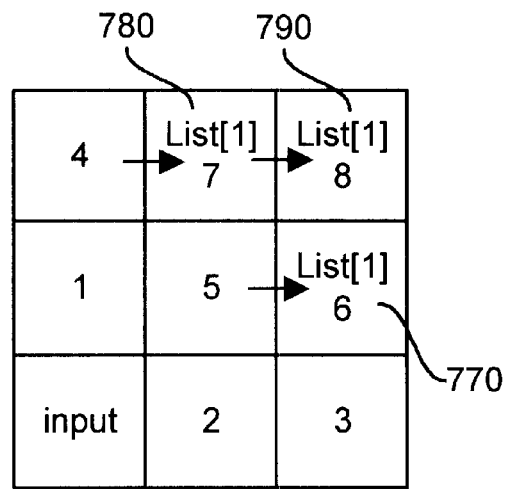

The recursive sub-cubing method is illustrated in FIGS. 7–10 using the same two-dimensional (time and location) data organized into two respective hierarchies depicted in FIG. 10 and discussed above. The method recursively calls the same procedure that operates on the input cells in one zone and creates the data cells in previously empty zones above and to the right of the input data zone.

Figure 7:
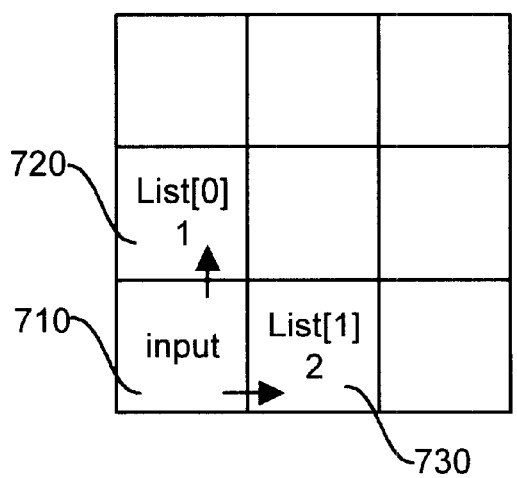
FIGS. 7–10 provide an overview illustration of the order in which hierarchical levels are processed by the preferred recursive method described in detail in connection with FIGS. 11–19.

Thus, as shown in FIG. 7, the process begins by processing the input composite detail (city-month; e.g. <C3-Aug01>) in the zone 710 as the first segment. Each segment is processed first in the time dimension (hierarchy number zero) creating parent List[0] and then in the location dimension (hierarchy number one) creating parent List[1]. Thus, the beginning segment in zone 710 is processed in step 1 to create List[0] in zone 720, and is again processed with respect to the second hierarchy to produce List[1] in zone 730.

The sequence in which the sub-cubing method handles the remaining segments is shown in FIGS. 7–8 of the drawings, and is best understood by considering the following pseudo-code:

```
[01]   for (i = 0; i < #bases; i++)
[02]       hierarchy[i] = mergehierarchy(i);
[03]   count = 0 ;
[04]   ihier = 0 ;
```

```
[05]        current = initial worklist ;
[06]        while (ihier >= 0)
              {
[07]            for (i = ihier ; i < #hierarchies ; i++)
                     list[i] = process_worklist(current, hierarchy[i]) ;
[08]            for (ihier = #hierarchies ; ihier >= 0 ; ihier--)
                     if (current = worklist[ihier])
                          break;
              }
```

As indicated at [01] and discussed earlier in connection with FIGS. 20–27, a first pass is made through the base dimension hierarchies, for each one construct a single merged multiparent hierarchy based on any multiple hierarchies over that dimension. The sub function "mergehierarchy" called at [02] for each base will be described in more detail later.

In the main routine above, the variable "count" is initialized to zero at [03] and is incremented during processing when each new worklist is generated. The variable "iheir" is initialized to zero at [02] and operates as an index into the hierarchy recursion stack. The array variable "current" holds the segment (worklist) currently being operated upon and is initialized at [05] to hold the initial data from the composite dimension, the base for the join hierarchy.

With ihier=0, and the loop variable "i" initially set equal to ihier, the for-loop at [07] calls the sub function "process_worklist" to process the current segment in zone 710 first with respect to the hierarchy in the time dimension (ihier=0) to produce list[0] in zone 720, and then increments "i" to process the current segment 720 with respect to the second hierarchy to produce list[1] in zone 730 as shown in FIG. 7.

As seen in the pseudo-code, the for-loop at [08] loops backward, decrementing ihier, looking for the first index that returned children. Since children are found in zone 730 when ihier=1), the process breaks out of the loop and continues processing at [07]. As seen in FIG. 8, since ihier equals 1, "i" is initialized to 1 at [07] so that the new current data in zone 730 is only processed with respect to hierarchy no. 1 to create the List[1] data in segment 740. After the data is segment 730 is processed, the for-loop at [08] again loops backward to process the data in the zone 740 which, being the top of hierarchy no. 1, hence produces no children. The for-loop at [08] then decrements to hierarchy number zero and to find the children previously created as List[0] in zone 720.

As seen in FIGS. 9 and 10, the children in zone 720 are then processed by the for-loop at [07] to produce a new List[0] in zone 750 at step 4, and a new List[1] in zone 760 at step 5. The for-loop at [08] then processes the new children in zone 760 first, creating List[1] in zone 770 at step 6 at the top of hierarchy number 1. Processing continues at steps 7 and 8 to complete the join hierarchy by adding the data to zones 780 and 790. Finally, when the for-loop at [08] find no unprocessed children, ihier is set to the value −1, ending the while loop at [06] to complete the processing.

The sub function "mergehierarchy" called at [02] takes all the hierarchies on a given base and merges them into a single merged hierarchy over the base. The sub function "mergehierarchy" is described by the following pseudo-code (with explanatory comments within the delimiters "/*" and "*/".

```
[10] sub mergehierarchy(hierlist)
       {
[11]     if (#hierlist == 1)
              return hierlist[0];
[12]     mergedhier = new hierarchy( );
[13]     allparents = new bitmap( ); /* starts empty */
[14]     for (h = #hierlist; h >= 0; h--)
            {
[15]          curparents = new bitmap( );
[16]          foreach child (hierlist[h])
                 {
[17]               if (!(parent = hierlist[h][child])
                        continue;
[18]               if (!allparents[parent])
                        {
[19]                    mergedhier->add(parent, child);
[20]                    curparents->add(parent);
                        }
                 }
[21]          allparents->add(curparents);
            }
       }
```

The process described by the pseudocode above merges all of the hierarchies in a given dimension into a single hierarchy. If, as seen at [11], the base dimension has only a single hierarchy over it, then that hierarchy may be used and there is no need to perform a merge.

At [12], a new, empty hierarchy is created to hold the merged result of all the multiple hierarchies on this dimension. At [13], a new, empty bitmap named "allparents" is created to track the parents defined in all the hierarchies.

As indicated at [14], a for-loop decrements the loop variable "h" starting at with the count of members in the hierarchy list "hierlist" and looping backward over the hierarchies to construct the merged hierarchy. At the start of each loop, a new, empty bitmap named "curparents" is created to track the parents within this hierarchy as seen at [15]. Then, within the current hierarchy, the foreach loop at [16] loops through the current hierarchy looking for child, parent pairs. If no parent is found for a given child, the process continues to the next child as seen at [17]. Once a child-parent pair is found, a check is performed at [18] to see if this parent has already been given children. If it has, then this parent is inconsistently defined and only the definition that was created by the "last" hierarchy (the first encountered in the backward looping) is used as seen at [19]–[20]. This prevents other hierarchies from giving any of these parents new definitions to yield the results previously described in connection with FIGS. 20–27.

After each child is processed, all the parents defined in the current hierarchy are added to the list of parents defined in all hierarchies as seen at 20.

The sub function "process_worklist" loops through a worklist of used cells which is preferably takes the form of a bitmap, and returns a list of parents in the currently specified hierarchy, with the parent list also preferably being expressed as a bitmap. This newly formed parent list bitmap is saved as List[i] as indicated at [4] above. The pseudo-code for the sub function "process_worklist" is set forth below. Each time it is called, the sub function supplied with a list of child cells named "children" and an identification of hierarchy number to be used in identifying parents.

```
[10]    sub process_worklist(children, hierarchy)
        {
[07]    bitmap parents = new bitmap;
[08]    foreach cell in children
            {
[09]        foreach parent (hierarchy[cell])
                {
[10]            parents->add(parent);
[11]            JOINHIER->add(parent, child);
                }
            }
[12]    if (empty(parents))
            return null ;
        else
            return parents ;
        }
```

As seen at [07], the sub function process_worklist begins by initializing a new, empty bitmap to hold the parent list. Then, as indicated at [08], the following process takes place for each cell in the supplied children worklist: the identified hierarchy is used to identify the each parent cell (if any) for that child cell as indicated at [09] and, if it exists, the identified parent cell is added to the parents bitmap at [10]; and the join hierarchy data structure "JOINHIER" is built for the relation of the parent to the child cell being processed. The join hierarchy data structure JOINHIER contains the information that will eventual be used to perform the actual aggregation.

As seen at [12], if processing of the children worklist for the specified hierarchy identifies no new parent cells for any member of the supplied childlist in the identified hierarchy, the sub function returns a null value; otherwise it returns the newly created parent list as the next worklist as indicated earlier at [04] which will be processed in a subsequent call to the sub function.

As previously noted, the order in which the hierarchies are processed may be different. FIGS. 11–19 depict the processing of the two-hierarchy database shown in FIG. 4 by processing selecting the city-state-region location hierarchy as hierarchy number 0, and the month-quarter-year hierarchy as hierarchy number 1.

Figure 11:
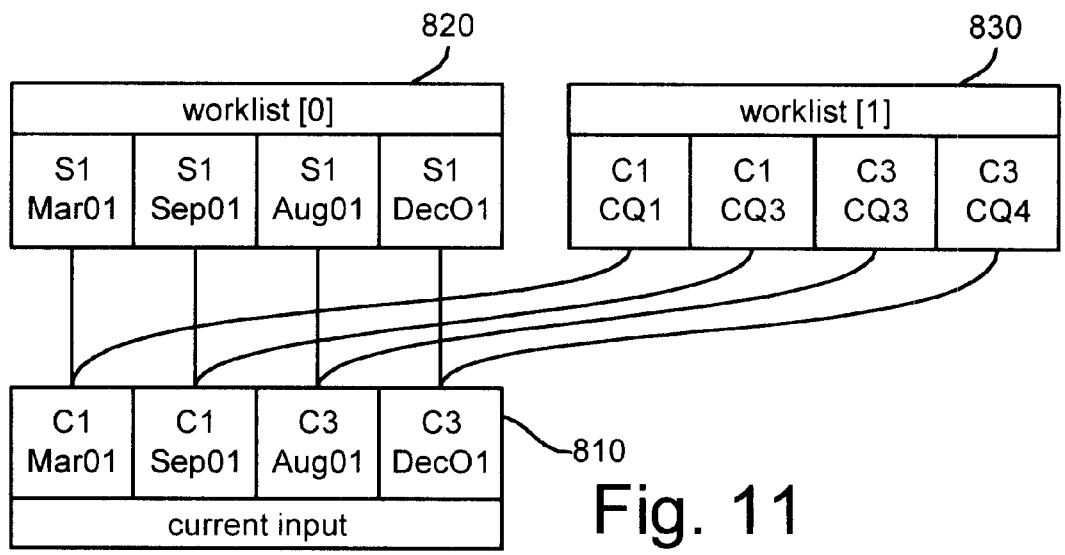
FIGS. 11–19 are diagrams illustrating the sequence of steps employed in the preferred recursive sub-cubing method for creating a join hierarchy.
Figure 12:
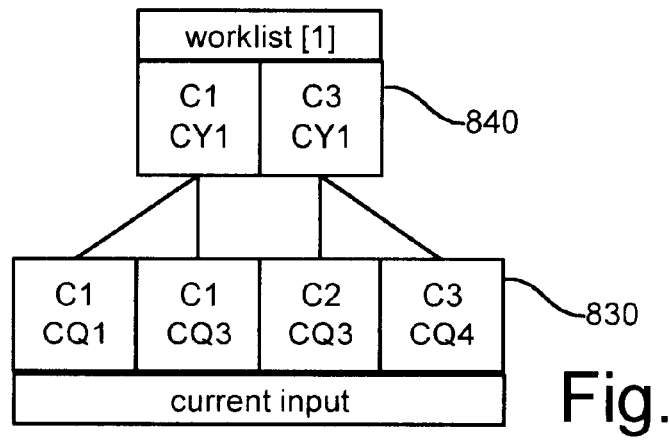
Figure 13:
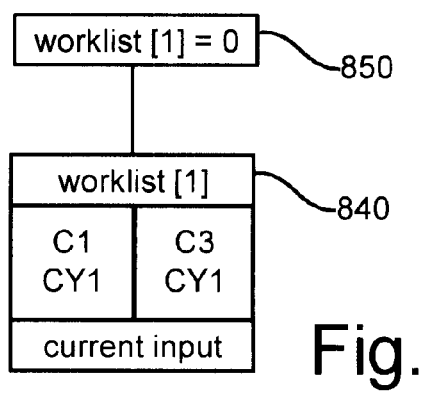

Thus, as depicted in FIG. 11, the input city-month data 810 from the composite dimension is first processed to form the parent state-month data in worklist[0] at 820. Then, as shown in FIG. 12, the city-year parents 840 or the city-year data 830 are created. Next, as shown in FIG. 13, the city-year data at 840 is processed but, since the top of the hierarchy has been reached, a null result is returned as indicated at 850.

Figure 14:
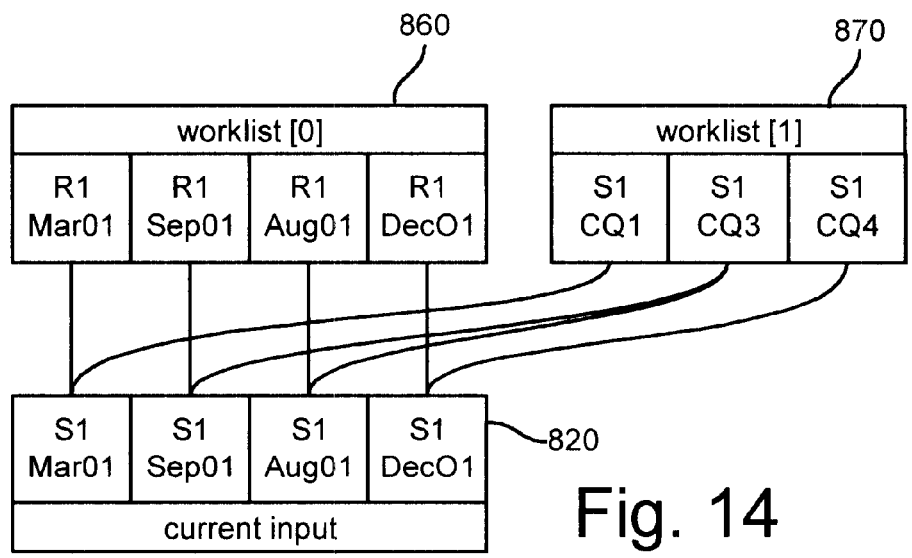
Figure 15:
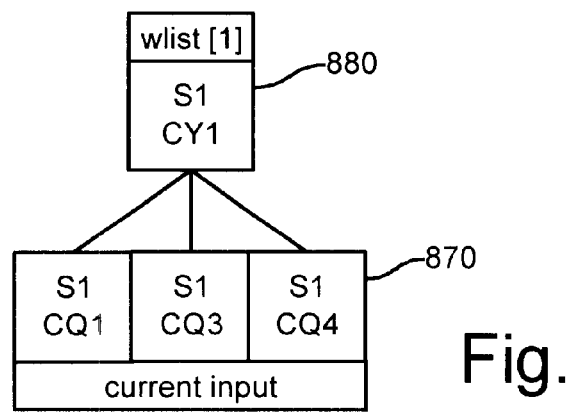
Figure 16:
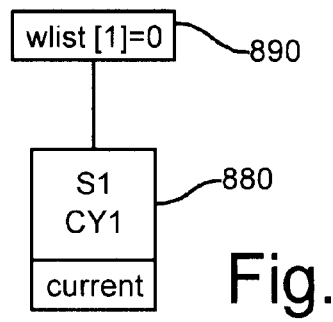

As seen in FIG. 14, processing returns to state-month data 820 created when the input data was processed at seen in FIG. 11. The region-month parents are placed in worklist[0] as seen at 860, and the state-quarter parents are placed in worklist[1] at 870. The state-quarter data 870 is then processed to identify the single state-year parent at 880 (since all of the original input cells at 820 are in the same state and year). Since the cell 880 has no parents, the processing of that cell returns a null as seen at 890 in FIG. 16.

Figure 17:
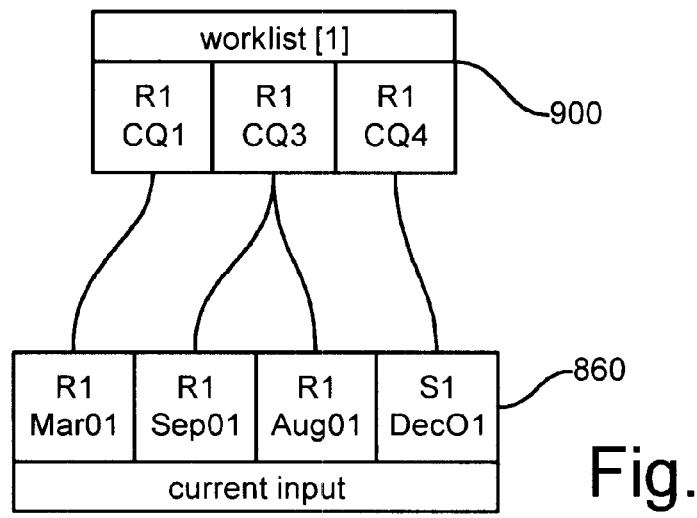
Figure 18:
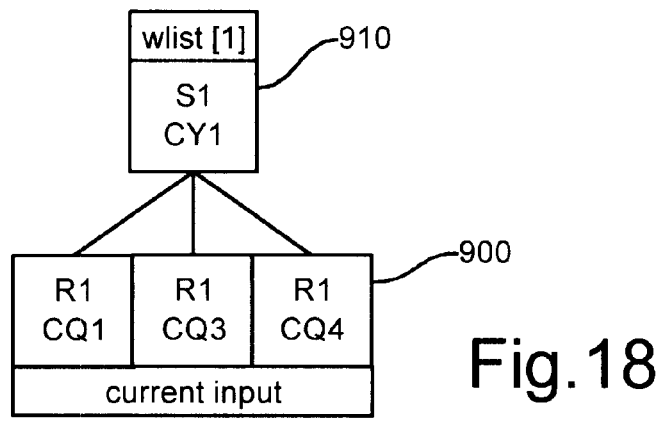
Figure 19:
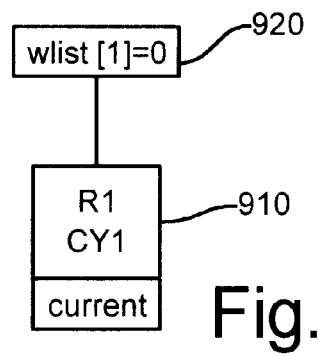

The region-month data 860 produced as shown in FIG. 4 is then processed in the time dimension to yield the region-quarter data 900 as seen in FIG. 17. Finally, the single region-year parent 910 of the region-quarter data 900 is then produced as shown in FIG. 18 and, since the cell 910 has no parent, it returns a null when processed as seen at 920 in FIG. 19 to complete the processing.

As noted earlier, each of these worklists may be advantageously represented as a bitmap of the cells contained within it and may be used as a basis of generating more aggregate worklists, which also take the form of bitmaps. To minimize the need for input-output data transfers, all the derived worklists of a single worklist are preferably generated at the same time. This is accomplished without keeping more than n-worklists active at any given time with the result that a reduction in input-output data transfers is achieved without requiring substantially larger memory space As described above, the preferred method for creating a join hierarchy makes use of an array of worklists where each worklist is a list of values within the composite (e.g., state-month, region-quarter, etc.). When the function is first entered this array is completely empty and there is an initial starting list that serves as the input source (i.e., the detail level cells within the composite). The method then proceeds as follows:

1. Loop over the input source with each hierarchy in turn, saving the resulting parents into positions within the array of worklists. If there were no parents using a given hierarchy then that position within the array is left empty.
2. Then, loop backwards through the worklist array looking for a non-empty worklist. Empty worklists represent completed subcubes; accordingly, this backward search seeks the innermost incomplete subcube. When no further incomplete subcubes are found, return to step 1 using the parent list of that worklist as the input and only looping over the hierarchies that are equal to or greater than the index of the current subcube.

Conclusion

It is to be understood that the specific methods and examples that have been described above are merely illustrative applications of the principles of the invention. Numerous modifications may be made to the methods and data structures that have been described without departing from the true spirit and scope of the invention.

What is claimed is:

1. A method for creating a composite-join hierarchy for use in aggregating data in a multi-dimensional array of data values, said multi-dimensional array of data values being organized in at least one dimension in accordance with a plurality of hierarchical relationships, said method comprising, in combination, the steps of:

merging said plurality of hierarchical relationships into a single hierarchical relationship, storing an executable program for subdividing an input data worklist representing a data array of n dimensions into sublists each representing a data array of (n−1) dimensions forming part of said composite-join hierarchy, storing an initial worklist containing data representing said multidimensional array of data values, employing an iterative routine for first executing said program to process said initial worklist into to create result sublists, and to thereafter repeatedly execute said program to process each result sublist produced by said program until no further unprocessed result sublist containing data remains and the creation of said composite-join hierarchy is completed.

2. The method as set forth in claim 1 wherein said input data worklist that is subdivided by said program includes a bitmap representation of the array locations that are occupied by data in said input data worklist.

3. The method as set forth in claim 2 wherein each given one of said sublists produced by said program includes a bitmap representation of the array locations that are occupied by data in said given one of said sublists.

4. A method for creating a composite-join hierarchy for use in aggregating a multi-dimensional array of data values, said multi-dimensional array of data values being organized in at least one dimension in accordance with a plurality of hierarchical relationships, said method comprising, in combination, the steps of:

merging said plurality of hierarchical relationships into a single hierarchical relationship, storing an executable program for processing the data in an input worklist representing a data array of n dimensions which is organized into hierarchical levels in at least one of those dimensions, said program producing a sublist for every combination of hierarchical levels represented in said data array, storing an initial worklist containing data representing said multidimensional array of data values, employing an iterative routine for first executing said program to first process said initial worklist to create result sublists, and to thereafter repeatedly execute said program to complete said composite join hierarchy by processing each result sublist produced by said program until no further unprocessed result sublist that contains data remains.

5. The method as set forth in claim 4 wherein said input data worklist that is subdivided by said program comprises a bitmap representation of the array locations that are occupied by data in said input data worklist.

6. The method as set forth in claim 5 wherein each given one of said sublists produced by said program comprises a bitmap representation of the array locations that are occupied by data in said given one of said sublists.

7. A method for creating a composite-join hierarchy for use in aggregating data in a multi-dimensional array, said multi-dimensional array of data values being organized in at least one dimension in accordance with a plurality of hierarchical relationships, said method comprising, in combination, the steps of:

merging said plurality of hierarchical relationships into a single hierarchical relationship, storing an executable program for subdividing an input data worklist representing a said data array of n dimensions into sublists each representing a data array of (n−1) dimensions forming part of said composite-join hierarchy, storing an initial worklist containing data representing said data in a multi-dimensional array, employing an iterative routine for first executing said program to first process said initial worklist into to create result sublists, and to thereafter repeatedly execute said program to process each result sublist produced by said program until no further unprocessed result sublist containing data remains to complete the creation of said composite-join hierarchy.

8. The method as set forth in claim 7 wherein said input data worklist that is subdivided by said program includes a bitmap representation of the array locations that are occupied by data in said input data worklist.

9. The method as set forth in claim 8 wherein each given one of said sublists produced by said program includes a bitmap representation of the array locations that are occupied by data in said given one of said sublists.

10. A method for creating a composite-join hierarchy for use in aggregating a multi-dimensional array of data values, said multi-dimensional array of data values being organized in at least one dimension in accordance with a plurality of hierarchical relationships, said method comprising, in combination, the steps of:

merging said plurality of hierarchical relationships into a single hierarchical relationship, storing an executable program for processing the data in an input worklist representing a data array of n dimensions which is organized into hierarchical levels in at least one of those dimensions, said program producing a sublist for every combination of hierarchical levels represented in said data array, storing an initial worklist containing data representing said multidimensional array of data values, employing an iterative routine for first executing said program to first process said initial worklist to create result sublists, and to thereafter repeatedly execute said program to complete said composite join hierarchy by processing each result sublist produced by said program until no further unprocessed result sublist that contains data remains.

11. The method as set forth in claim 10 wherein said input data worklist that is subdivided by said program comprises a bitmap representation of the array locations that are occupied by data in said input data worklist.

12. The method as set forth in claim 11 wherein each given one of said sublists produced by said program comprises a bitmap representation of the array locations that are occupied by data in said given one of said sublists.

* * * * *